United States Patent [19]

Nakajima

[11] Patent Number: 4,862,282
[45] Date of Patent: Aug. 29, 1989

[54] FACSIMILE MACHINE WITH CAPABILITY OF READING HALF-TONE AND BINARY IMAGE DATA

[75] Inventor: Toshifumi Nakajima, Tokyo, Japan

[73] Assignee: Canon Kabushiki Kaisha, Tokyo, Japan

[21] Appl. No.: 155,083

[22] Filed: Feb. 11, 1988

[30] Foreign Application Priority Data

Feb. 16, 1987 [JP] Japan ............................ 62-34177

[51] Int. Cl.⁴ ............................................. H04N 1/32
[52] U.S. Cl. .................................... 358/400; 358/434; 358/456
[58] Field of Search ................ 358/256, 257, 283, 280

[56] References Cited

U.S. PATENT DOCUMENTS

| | | | |
|---|---|---|---|
| 4,646,160 | 2/1987 | Iizuka et al. | 358/257 |
| 4,672,460 | 6/1987 | Tsuda | 358/257 |
| 4,695,895 | 9/1987 | Nagashima | 358/287 |
| 4,741,021 | 4/1988 | Kotani et al. | 358/257 |

Primary Examiner—James J. Groody
Assistant Examiner—Kim Yen Vu
Attorney, Agent, or Firm—Fitzpatrick, Cella, Harper & Scinto

[57] ABSTRACT

A facsimile machine comprises a reader having a plurality of read modes for reading a text sheet, a memory for storing image data, a transmitter for transmitting the image data, and a controller for selectively transmitting the read image data through the memory or without routing it through the memory in accordance with the read mode of the the reader. The transmitter has a plurality of modes, including halftone and binary image modes. The facsimile machine is advantageous in providing efficient transmission of data, and may be used, for example, in providing an efficient scheme when a busy signal is received at the calling station.

6 Claims, 5 Drawing Sheets

FACSIMILE MACHINE WITH CAPABILITY OF READING HALF-TONE AND BINARY IMAGE DATA

BACKGROUND OF THE INVENTION

1. Field of the Invention

The present invention relates to a facsimile machine having an image memory.

2. Related Background Art

A conventional facsimile machine which carries out both memory transmission and half-tone (gray level) transmission, reads a transmission text, temporarily stores the read image information in a memory and then transmits it. In the conventional facsimile machine, the memory transmission is carried out whether a half-tone mode is selected or not.

On the other hand, when a half-tone image is encoded by using MH (modified Huffman) or MR (modified READ) which is a conventional G3 facsimile encoding system, image data may increase by a factor of several times than that in a non-compression mode. Accordingly, in the half-tone mode, the number of fill-bits is small and substantial reduction of communication time by the removal of the fill-bits is not to be expected.

Half-tone coding by a dither method increases a data length per line compared to that obtained with a binary image. In a CCITT G3 facsimile machine, if data is shorter than a minimum transmission time for one line, fill-bits (fill-data) are filled, i.e inserted, before the transmission to assure the minimum transmission time. In a memory communication, data is transferred between a memory of a communication unit and a memory of a receiver, and the, merit of the memory communication is that it is affected by a speed of a record unit (a unit which includes a motor) of the receiver, but in the memory transmission (communication), it is not affected and the speed is increased by transferring data with the fill-bits omitted.

In most cases of the half-tone encoding by the dither method, the data length for one line is longer than the minimum transmission time. Accordingly, there are few fill-bits in the half-tone encoding. Accordingly, there is little difference in speed of the half-tone image transmission between the conventional transmission and the memory transmission. Accordingly, in the half-tone mode, much is not expected for the reduction of communication time by the removal of the fill-bits.

In the conventional facsimile machine which carries out both the memory transmission and the half-tone transmission, if the memory transmission is carried out while the half-tone mode is selected, much reduction of the communication time is not expected. The memory transmission is disclosed in U.S. patent applications filed by the assignee of the present invention, Ser. Nos. 089,055, filed on Aug. 24, 1987, 755,361, filed on July 16, 1985 and 834,780, filed on Feb. 28, 1986. In U.S. patent application Ser. No. 665,353, filed on Oct. 26, 1984, data transmission is carried out without routing through the memory if the amount of data is large. In U.S. patent applications Ser. Nos. 082,977, filed on Aug. 4, 1987, and 014,077, filed on Feb. 3, 1987; data is not encoded but stored in a memory if amount of encoded data is larger than amount of original data.

SUMMARY OF THE INVENTION

It is an object of the present invention to improve a facsimile machine.

It is another object of the present invention to solve the above problem.

It is another object of the present invention to efficiently transmit a half-tone image.

It is another object of the present invention to transmit a half-tone image without routing it through a memory in a facsimile machine in which image data is transmitted after it has been stored in the memory.

It is another object of the present invention to provide a binary image mode and a half-tone image mode, transmit an image after it has been stored in a memory in the binary image mode, and transmit an image without routing it through the memory in the half-tone image mode.

Other objects of the present invention will be apparent from the detailed description of the preferred embodiment.

DETAILED DESCRIPTION OF THE PREFERRED EMBODIMENTS

One embodiment of the present invention is explained in detail with reference to the accompanying drawings.

Figure 1:
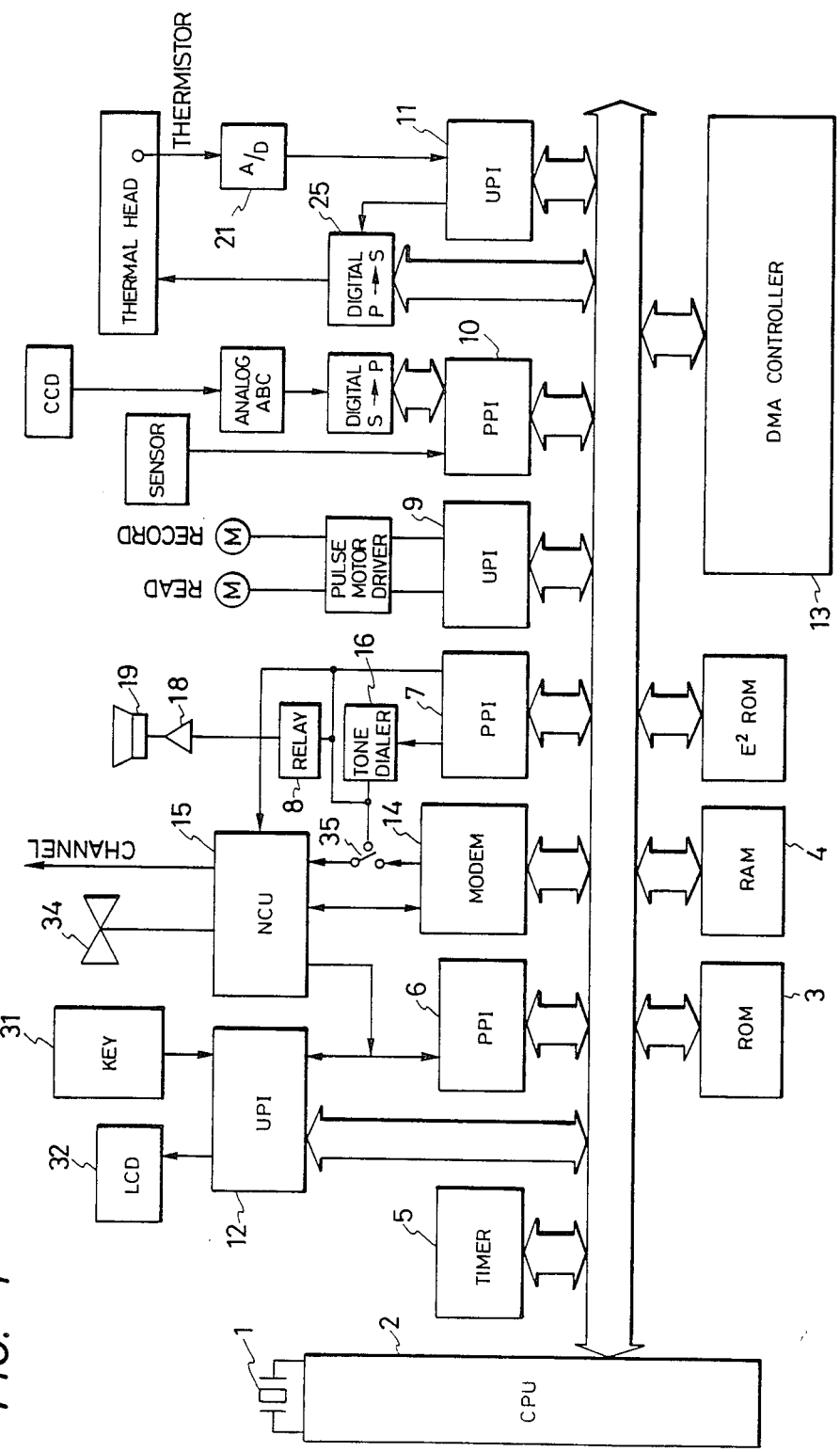
FIG. 1 shows a block diagram of one embodiment of the present invention.

FIG. 1 shows a block diagram of one embodiment of the present invention.

In FIG. 1, a crystal oscillator 1 generates a reference clock for an overall system. The clock is supplied to a CPU 2 including a microprocessor as the reference clock. The CPU 2 is connected to a ROM 3, a RAM 4, a timer 5, programmable parallel I/O's (PPI's) 6, 7 and 10, and peripheral CPU's (UPI's) 9, 11 and 12 through a data bus and an address bus. The CPU 2 controls the overall facsimile system and encodes and decodes image data.

When a half-tone mode is selected, the CPU 2 transmits image information without storing it in the memory (RAM 4).

A DMA controller 13 controls the memories (ROM 3 and RAM 4), and the UPI 9 controls the drive of a text sheet and a record sheet. The UPI 11 controls a parallel-to-serial converter 25, and a record unit of a thermal head, and the UPI 12 displays a key input switch 31 and a liquid crystal display LCD 32.

A modem 14 modulates and demodulates image data, and transmits and receives facsimile communication protocol signals. A network control unit (NCU) 15 selectively connects a line to a telephone set 34 or the modem 14.

A dialer 16 sends a dialing signal to the line in accordance with telephone number data of a communication equipment supplied from the CPU 2 to the PPI 7. Further, a relay 8, a speaker driver 18, a speaker 19 and an analog-to-digital converter 21 are provided.

An operation of the embodiment is now explained.

Figure 2A:
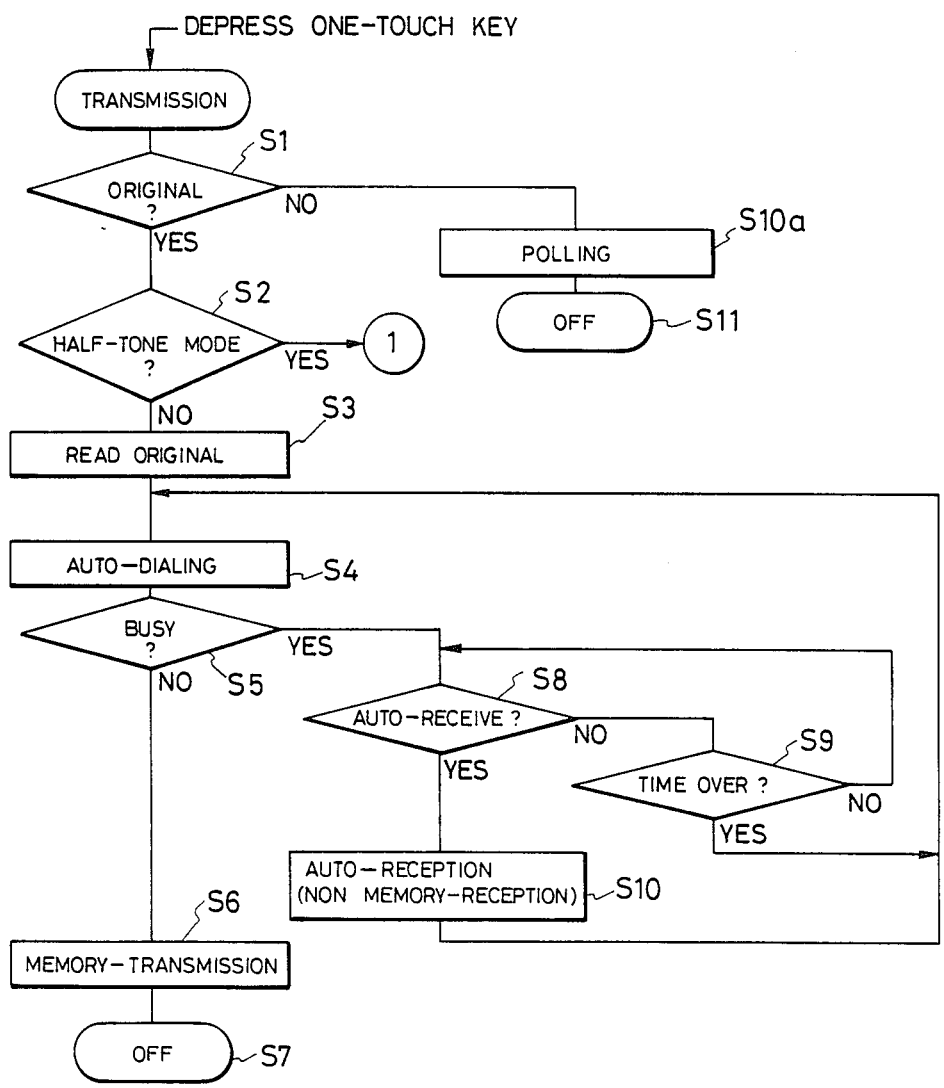
FIG. 2A and 2B show flow charts of an operation of the embodiment.
Figure 2B:
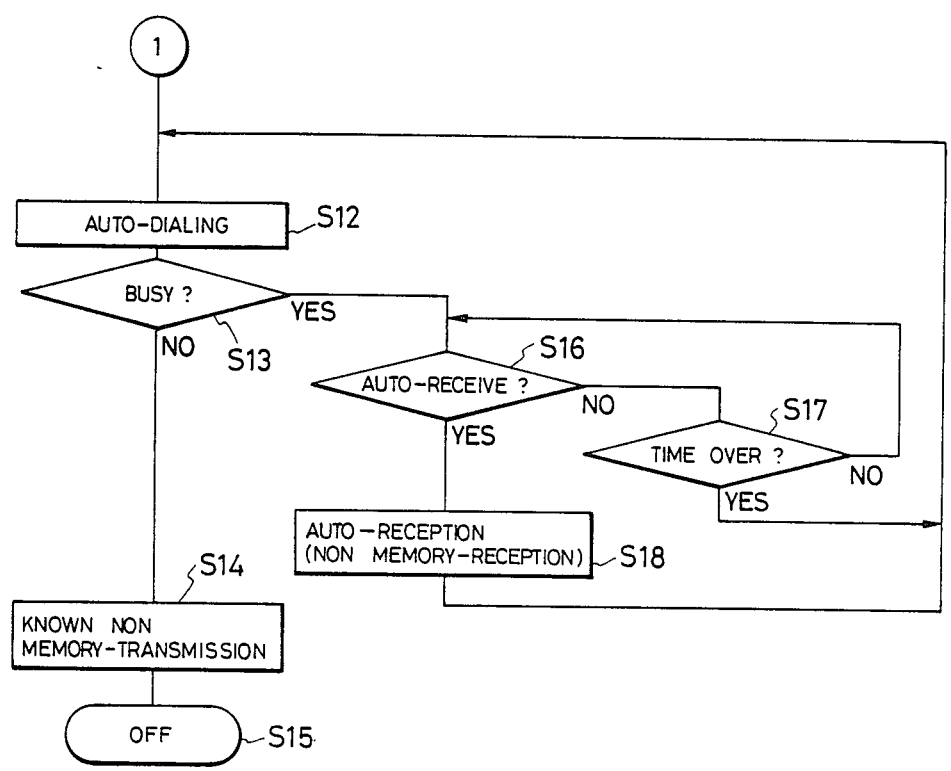
Figure 3:
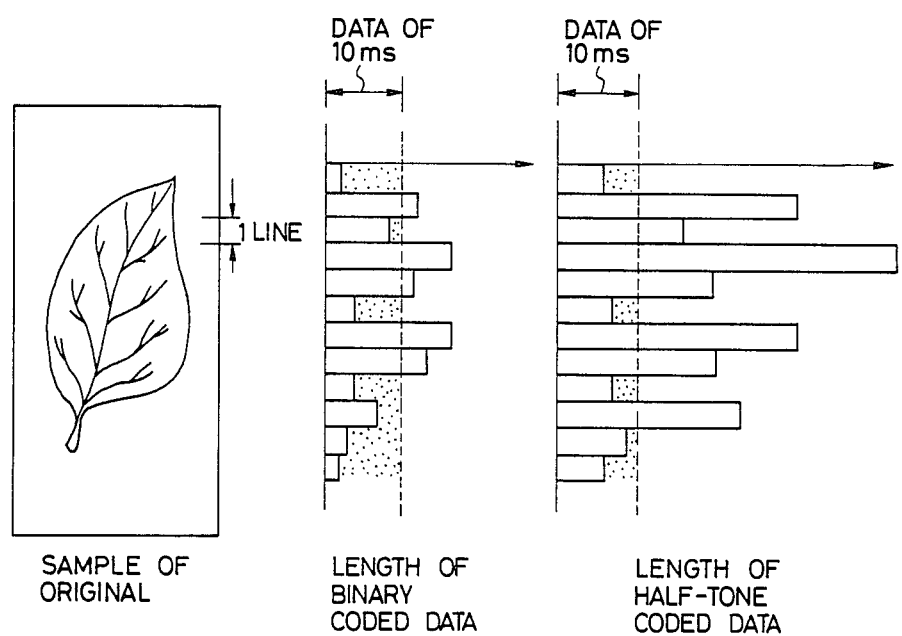
FIG. 3 illustrates data lengths of binary/half-tone images.

FIG. 2A and 2B show flow charts of a control operation of the CPU of the embodiment.

When a one-touch key is depressed, the CPU 2 receives information of a sensor (text sheet sensor) through the PPI 10 to determine presence or absence of the text sheet (S1). If there is no text sheet, polling is carried out (S10a). If there is a text sheet, whether a user has set the half-tone mode or not is checked (S2). The CPU 2 determines, through the UPI 12, whether a half-tone key of the keys 31 has been depressed or not. In the half-tone mode, automatic calling is carried out to a designated destination. The CPU 2 determines, through the PPI 7, whether the destination station is busy or not based on a detection signal by the NCU 15 (S13). The NCU 15 is provided with a detection circuit to detect a tone signal supplied from the line. When it detects a busy tone, it produces a busy tone detection signal. When the CPU 2 receives the busy tone detection signal through the PPI 7, it determines that the destination station is busy. If the destination station is busy, redialing is waited for (S16, S17).

If data is sent from another facsimile machine, the memory reception is carried out on a condition that the RAM 4 has a sufficient vacant area to store the received data (S18). Thereafter, the destination station which was busy is automatically recalled (S12). If the destination station is not busy, the text set in the read unit in the half-tone mode is read and it is encoded and transmitted (non-memory transmission) (S14). Then, it is turned off (S15).

On the other hand, if the half-tone mode has not been set (S2), the text is read, the read data is MH or MR-encoded, and it is stored in the RAM 4 (S3). The destination station designated by the keys 31 is automatically dialed (S4), and whether the destination station is busy or not is checked (S5). If it is not busy, the memory transmission is carried out (S6), and after the transmission, it is turned off (S7). In this manner, the memory transmission is carried out.

If the destination station which was automatically called is busy (S5), redialing is waited for. (S8, S9). If auto-receive in Step 8, it is automatically received (S10). Since the image data to be transmitted has been stored in the memory (RAM 4) in the step S3, the non-memory reception is carried out to sequentially decode the received data and record it on a record sheet (S10). The transmission with a communication charge, that is, the transmission by a calling station can be done by the fast memory transmission (S6) so that the charge payable by a user can be reduced.

Figure 4:
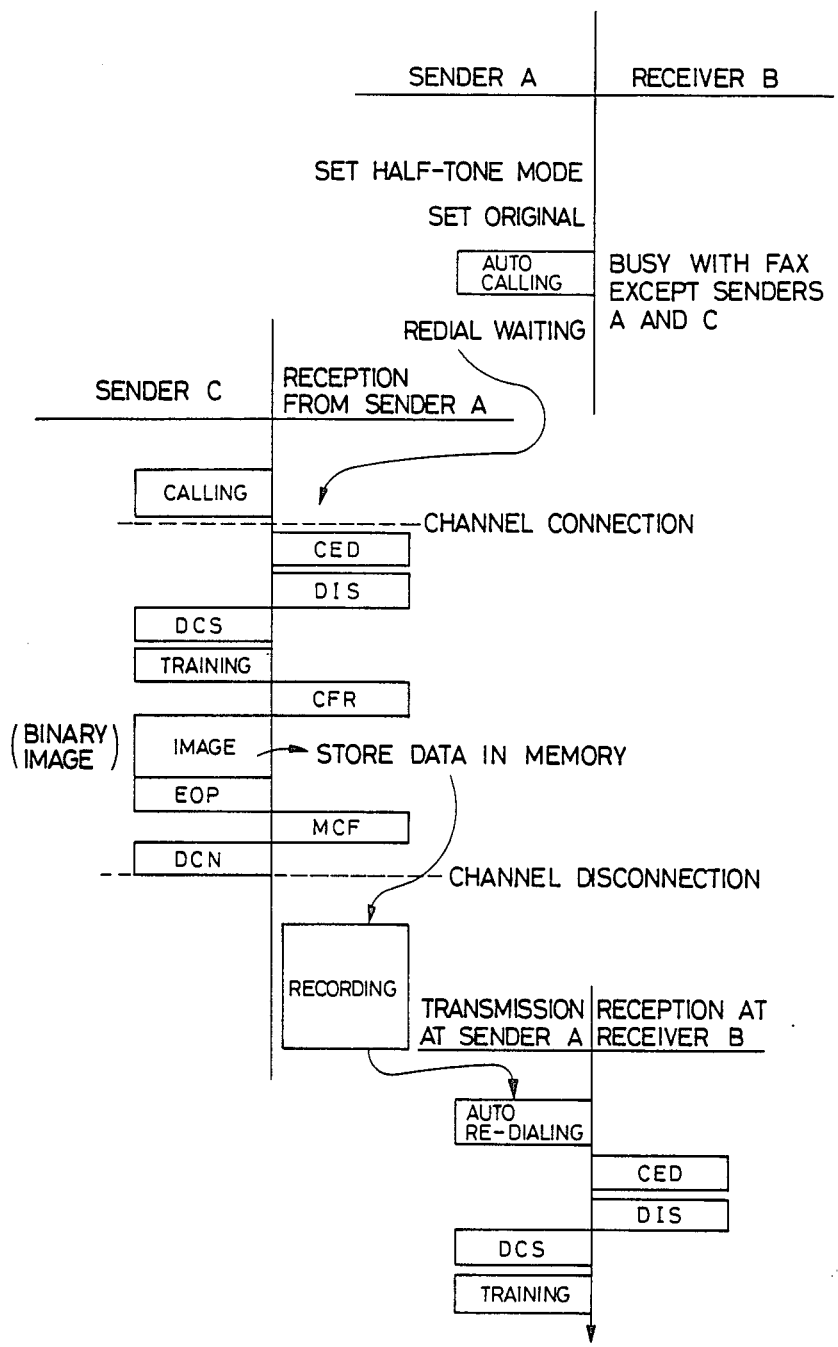
FIG. 4 shows a procedure according to the preferred embodiment.

FIG. 4 illustrates a procedure of the present embodiment.

It is assumed that the facsimile machines A, B and C are connected to lines of different telephone numbers. It is also assumed that a text sheet has been set in the facsimile machine A having a memory transmission function, a user thereof has selected the half-tone mode and intends to carry out the automatic transmission to the facsimile machine B. Assuming further that the facsimile machine B is busy with other facsimile machine than the facsimile machines A and C, the facsimile machine A waits for redialing. It is assumed that the facsimile machine C has started the memory transmission to the facsimile machine A.

Since the facsimile machine A has been waiting for the redialing, it does not yet read the text sheet to be transmitted in the half-tone mode but the text sheet is left set on a text table. Accordingly, while the facsimile machine A has a memory for memory transmission/reception, the memory is unused and it may be used for receiving the data. Accordingly, the facsimile machine A carries out the memory reception in response to the memory transmission from the facsimile machine C. Since it is the memory communication of the binary image, the communication speed of the facsimile machine is increased. After the memory communication, the line is released and the data is recorded on the record sheet.

After the recording, the facsimile machine A automatically recalls the facsimile machine B which was waiting for the redialing, and transmits the dithered half-tone image to the facsimile machine B as it is without memory transmission. The memory transmission is not carried out because the speed-up is not expected since it is the half-tone image.

In this case if the half-tone image (data quantity of the half-tone image is usually larger than data quantity of binary image, and all memory areas may be exhausted) to be transmitted from the facsimile machine A to the facsimile machine B is stored into the memory of the facsimile machine A, the memory of the facsimile machine A is occupied by the data supplied from the facsimile machine C. As a result, the facsimile machine A cannot receive the memory communication from the facsimile machine C. Accordingly, the automatic reception is accepted while the facsimile machine is waiting for the radial for the automatic transmission. In the present embodiment, the memory size of the RAM 4 is in the order of 1M bytes which can store 6 to 7 standard size A4 text sheets. In the facsimile machine of such a small memory capacity, it is necessary to effectively utilize the memory. In accordance with the present embodiment, a small capacity memory (RAM 4) can be efficiently utilized.

In accordance with the present invention, in the facsimile machine which carries out the memory transmission and the half-tone transmission, the communication time can be shortened when the half-tone mode is selected.

The present invention is not limited to the illustrated embodiment but various modifications thereof may be made.

I claim:

1. A facsimile machine comprising:
   read means for reading an image;
   memory means for storing image data read by said read means;
   transmission means for transmitting the image data, said transmission means having a plurality of transmission modes including a halftone image mode; and
   select means for selecting transmission of read image data through said memory means or outside of said memory means, said select means performing the selection operation in accordance with a transmission mode of said transmission means;
   wherein, when said halftone image mode is effected, the image data is transmitted outside of said memory means.

2. A facsimile machine according to claim 1, wherein said transmission means has a binary image mode and said halftone image mode.

3. A facsimile machine according to claim 1, wherein the read image data is encoded in a predetermined coding system and then stored in said memory means.

4. A facsimile machine according to claim 1, further comprising call means for calling a destination station to connect a line to the destination station, and detection means for detecting whether data can be transmitted to the called station, wherein said control means accepts other communication when said detection means detects that the data cannot be sent and transmission is waited for.

5. A facsimile machine comprising:
   read means for reading an image;
   memory means for storing image data read by said read means;
   transmission means for transmitting the image data, said transmission means having a plurality of transmission modes including a halftone image mode;
   select means for selecting one of said transmission modes; and
   control means adapted to transmit read image data without storing the read image data in said memory means in response to said select means selecting said halftone image mode.

6. A facsimile machine according to claim 5, wherein said image data is encoded and stored in said memory means.

* * * * *